US007930231B2

(12) United States Patent
Malackowski et al.

(10) Patent No.: US 7,930,231 B2
(45) Date of Patent: *Apr. 19, 2011

(54) SYSTEM FOR AND METHOD OF RISK MINIMIZATION AND ENHANCED RETURNS IN AN INTELLECTUAL CAPITAL BASED VENTURE INVESTMENT

(75) Inventors: James E. Malackowski, Chicago, IL (US); David A. Kennedy, Marietta, GA (US); Roger L. May, Fenville, MI (US)

(73) Assignee: Ocean Tomo, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/027,812

(22) Filed: Feb. 7, 2008

(65) Prior Publication Data

US 2008/0126269 A1    May 29, 2008

Related U.S. Application Data

(63) Continuation of application No. 09/814,547, filed on Mar. 22, 2001, now Pat. No. 7,353,202.

(51) Int. Cl.
*G06F 40/00* (2006.01)
(52) U.S. Cl. .................................. 705/36 R; 705/35
(58) Field of Classification Search .................. None
See application file for complete search history.

(56) References Cited

U.S. PATENT DOCUMENTS

| | | | |
|---|---|---|---|
| 6,018,714 A | 1/2000 | Risen, Jr. et al. | |
| 6,330,547 B1 | 12/2001 | Martin | |
| 2002/0002523 A1 | 1/2002 | Kossovsky et al. | |
| 2002/0099637 A1 | 7/2002 | Wilkinson et al. | |
| 2002/0138384 A1 | 9/2002 | Malackowski et al. | |
| 2008/0126270 A1 | 5/2008 | Malackowski et al. | |

OTHER PUBLICATIONS

IThomson-CSF Gains Valuable U.S. Patents, G. Pascal Zachary. Wall Street Journal. (Europe). Brussels:Dec 7, 1992. p. 3.*
Industrial Funding of University research? (pro and con debate), Joshua Lederberg, Paul Baumann, Industrial Research, v25, p. 106(2), Sep. 1993.*
Using Ideas to Increase the Marketability of Your Firm, Annette Felazani Dwyer, Ford Harding, Journal of Management Consulting, v2n9, p. 56-61, Nov. 1996.*
U.S. Appl. No. 12/027,779, including its patent prosecution history, and the Office Actions therein, Malackowski et al.

(Continued)

*Primary Examiner* — Olabode Akintola
*Assistant Examiner* — Kellie Campbell
(74) *Attorney, Agent, or Firm* — Knobbe, Martens, Olson & Bear LLP

(57) ABSTRACT

The disclosure relates to an investment risk minimization system involving a venture capital investor and a venture needing investment from the venture capital investor. In such a system, an exemplary method can include providing an investment to a venture having an intellectual asset, and receiving a security interest in the intellectual asset. The security interest secures an ownership right upon failure by the venture to meet established parameters. Further, if the venture receiving the investment fails to meet the established parameters, the method includes obtaining an ownership interest in the intellectual asset, valuing the intellectual asset, and transferring the intellectual asset to a charitable organization.

5 Claims, 3 Drawing Sheets

OTHER PUBLICATIONS

Cieri, Richard M., et al. "Licensing Intellectual Property and Technology from the Financially-Troubled or Startup Company; PreBankruptcy Strategies to Minimize the Risk in a Licensee's Intellectual Property and Technology Investment." Business Lawyer, vol. 55: 1649, Aug. 2000.

Bowling, Brian. "Bank donates to house to Habitat for Humanity." Charleston Daily Mail. Charleston, W.V.: Nov. 30, 1999, p. 3C.

Fairley, Peter. "Dupont donates patents, gets tax write-off." Chemical Week. New York, N.Y.: Feb. 17, 1999. vol. 161, Iss. 6, p. 14.

* cited by examiner

SYSTEM FOR AND METHOD OF RISK MINIMIZATION AND ENHANCED RETURNS IN AN INTELLECTUAL CAPITAL BASED VENTURE INVESTMENT

CROSS-REFERENCE TO RELATED APPLICATIONS

The present application is a continuation of U.S. application Ser. No. 09/814,547, filed Mar. 22, 2001. The foregoing application is hereby incorporated by reference in its entirety.

FIELD OF THE INVENTION

The present specification relates generally to investment methods and systems. More particularly, the present specification relates to a system for and a method of risk minimization and enhanced returns in an intellectual capital based venture investment.

BACKGROUND OF THE INVENTION

In general, investors attempt to minimize the risk associated with investments. Heretofore investors have attempted to minimize risk associated with investing in ventures by assessing quality of management, business model risk, market opportunities, and possible returns on investment (ROI). Nevertheless, predicting ROI can be a difficult and inexact practice.

Such investment risks are particularly prevalent with early stage start-up or later stage technology dependent companies. Predicting success in such companies can be very challenging. Often such companies have few tangible assets that can be used as collateral in obtaining financing. Nevertheless, early stage and technology dependent companies can have great value in intangible or intellectual assets. Intellectual assets can include ideas that may or may not be incorporated into patents or patent applications. Intellectual assets can also include domain names, trademarks, copyrights, know-how, trade secrets, and a variety of other intellectual properties.

Investors can invest in the form of debt (i.e., a loan), equity (i.e., common or preferred stock), or a combination thereof. Conventionally, investors can recoup losses from failed investments (regardless of whether or not the investment was directed to early stage or technology dependent companies) by taking a tax deduction for loss or worthlessness of the loan or investment. The amount, timing and characterization of such a tax deduction differs depending upon whether the venture capital or private equity firm is treated as an "investor" or in the "trade or business of making loans". Typically, venture capital funds are treated as "investors" by the Internal Revenue Service (IRS). In such cases the loss can be taken as a capital loss. In order to take advantage of this capital loss, the burden is on the secured party to demonstrate that the loan or investment is completely worthless. Generally, such a demonstration involves either the commencement of a lawsuit against the debtor to obtain a judgment and collection on the judgment or a strong showing that taking such legal steps would not result in any recovery of value or payment on the debt. The nature of the deduction, the timing of the deduction and the manner of satisfying the secured party's burden of demonstrating worthlessness are all highly fact sensitive and differ from investor to investor and transaction to transaction.

Thus, there is a need for a system for and a method of risk minimization and enhanced returns in an intellectual capital based venture investment. Further, there is a need to recoup from losses incurred in investments other than taking a tax deduction for loss or worthlessness of the investment or loan. Even further, there is a need to make investment risk determinations where an investment is made in a venture having an intellectual asset, such as, a patent or patent application.

The teachings hereinbelow extend to those embodiments which fall within the scope of the appended claims, regardless of whether they accomplish one or more of the above-mentioned needs.

SUMMARY OF THE INVENTION

An exemplary embodiment relates to an investment risk minimization system involving a venture capital or private equity investor and a venture needing investment from said investor. In such a system, an exemplary method can include providing an investment to a venture having an intellectual asset, and receiving a security interest in the intellectual asset. The security interest secures an ownership right upon failure by the venture to meet established parameters. Further, if the venture receiving the investment fails to meet the established parameters, the method includes obtaining an ownership interest in the intellectual asset, valuing the intellectual asset, and transferring the intellectual asset to a charitable organization.

Another exemplary embodiment relates to a method of recouping losses in a failed venture capital investment where the failed venture capital investment is in a venture having an intellectual asset. This method can include obtaining cooperation from a debtor and any secured parties having security interests in the debtor, receiving full ownership of an intellectual asset from the debtor in satisfaction of an obligation incurred from an agreement with the debtor, holding the intellectual asset for one year from receiving full ownership of the intellectual asset, donating the intellectual asset to a permissible charitable donee after one year from receiving full ownership of the intellectual asset, and reporting an appraised value of the donated intellectual asset to the Internal Revenue Service to obtain a tax deduction for the donation.

Another exemplary embodiment relates to a method executed by a computing device to provide investment risk minimization determinations where an investment is made in a venture having an intellectual asset. This method can include receiving a determination of a value of an intellectual asset owned by an investment-seeking venture, determining an investment based at least partially on the value of the intellectual asset where the investment is made in the investment seeking venture in exchange for a security interest in the intellectual asset, determining minimum performance conditions for the investment seeking venture where the minimum performance conditions are indicative of conditions needed for the determined investment to be recouped, and, upon failure to meet the minimum performance conditions, determining tax benefits available where ownership of the intellectual asset is obtained and donated to a charitable organization.

Other features and advantages of embodiments of the present invention will become apparent to those skilled in the art upon review of the following drawings, the detailed description, and the appended claims.

BRIEF DESCRIPTION OF THE DRAWINGS

The invention is illustrated by way of example and not limitation in the figures of the accompanying drawings, in which like references indicate similar elements and in which.

DETAILED DESCRIPTION OF THE EXEMPLARY EMBODIMENTS

A system for and method of risk minimization and enhanced returns in an intellectual capital based venture investment are described. In the following description, for purposes of explanation, numerous specific details are set forth to provide a thorough understanding of exemplary embodiments of the invention. It will be evident, however, to one skilled in the art that the invention may be practiced without these specific details. In other instances, well-known structures and devices are shown in block diagram form to facilitate description of the exemplary embodiments.

Figure 1:
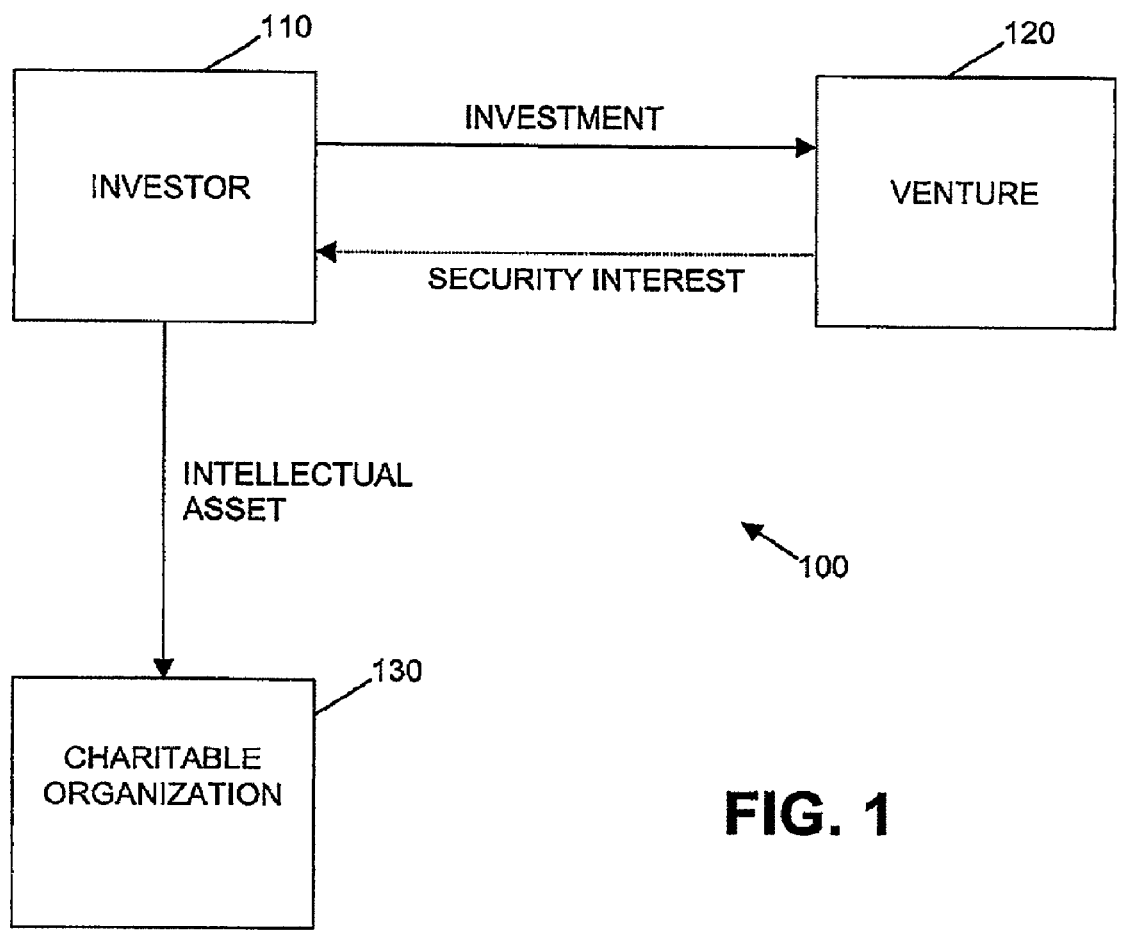
FIG. 1 is a general schematic representation of an investment risk minimization system in accordance with an exemplary embodiment.

FIG. 1 illustrates a diagrammatical representation of an investment risk minimization system 100. In an exemplary embodiment, investment risk minimization system 100 includes an investor 110, a venture 120, and a charitable organization 130. Investor 110 provides a venture capital investment in venture 120. In return for the venture capital investment, investor 110 receives a security interest in an intellectual asset (IA), such as, a patent, patents, or patent pending assets of venture 120. In the event of a failure to perform or achieve established parameters or performance objectives, investor 110 assumes ownership of the secured assets. Investor 110 can then transfer (e.g., sell, license, donate, etc.) the secured assets to an organization or entity, such as, charitable organization 130.

Investor 110 can be an individual, corporation, partnership, or other entity. Venture 120 can be an individual, a start-up company, a partnership, or other entity. The venture capital investment may be the form of cash, stock, a like kind investment, real estate, commercial paper, or other investment instruments. Performance obligations can be any type of goal or objective by which the success of venture 120 may be judged, either quantitatively or qualitatively. For example, performance objectives can include ROI goals over a predetermined period, earnings goals, market penetration goals, gross sales goals, or other such objectives.

In an exemplary embodiment, investment by investor 110 is structured to allow tax advantages from donation of the assets to an approved Internal Revenue Code Section (IRC) 501(c)(3) charitable organization. Donation to an IRC Section 501(c)(3) charitable organization can offset earnings from other investments within an investment portfolio to reduce taxable earnings.

While the rules governing charitable contributions are primarily covered by Internal Revenue Code (IRC) Section 170 (m), Revenue Ruling 58-260 provides the following specific insight into the deductibility of donated patents:

The fair market value of an undivided present interest in a patent, which is contributed by the owner of the patent to an organization described in section 170(c) of the Internal Revenue Code of 1954, constitutes an allowable deduction as a charitable contribution, to the extent provided in section 170, in the taxable year in which such property was contributed. [emphasis added]

The appraised fair value of intellectual capital (e.g., a patent) at the time of disposal (e.g., donation) may be significant. The tax deduction obtained from the disposal can be used to offset gains from other investments.

The funding of investor 110 may be generally broken into both an equity (majority) and debt (minority) transaction. The debt portion of funding is secured by the portfolio company's IA. This IA is reclaimed in the event of failure of venture 120 to achieve the established parameters and then auctioned or donated, Not all patents are believed to have donation value. In certain cases, these assets may simply be held for future use or sale. In assessing the best disposition strategy, consideration should be given to the likely future market for the technology, the ability of other ventures within the same portfolio to use the IA and the competitive protection afforded other related ventures by restricting competitive access to the IA.

In an exemplary embodiment, an independent valuation of the patents to be donated must be done. As the value is market-focused, the prior business result of the portfolio company will not strictly limit the appraised valuation. More specifically, the premise of value to be used is "fair market value" defined as the amount at which the asset would change hands between a willing buyer and a willing seller, within a commercially reasonable period of time, each having reasonable knowledge of the relevant facts, neither under any compulsion to act, with equity to both.

As to the measure of proof in determining the fair market value, all factors bearing on value are relevant including, where pertinent, the cost, or selling price of the item, sales of comparable properties, cost of reproduction, opinion evidence and appraisals. Fair market value depends upon value in the market and not on intrinsic worth.

The cost or actual selling price of an item within a reasonable time before or after the valuation date may be the best evidence of its fair market value. Before such information is taken into account, it must be ascertained that the transaction was at arm's length and that the parties were fully informed as to all relevant facts. Absent such evidence, even the sales price of the item in question will not be persuasive.

In a first exemplary embodiment, investor 110 obtains a security interest in the pending or issued patents of venture 120 at the time of the original investment. Such a security interest is structured such that ownership reverts back to investor 110 if venture 120 is liquidated.

In a second exemplary embodiment, investor 110 may alternatively structure an investment in such a way as to assign the patent rights of venture 120 to a separate Intellectual Asset ("IA") Holding Company unique for each investment (or collectively as IA Holdings) and then offer its portfolio companies an exclusive license cancelable if certain milestones are not reached. This strategy also has the benefit of making the collective IA of portfolio investments available to all entities. A further advantage is the potential of such a LA Holding Company to generate third party licensing income.

It is expected that the donated value of the IA may exceed the original investment by investor 110 allowing for complete fund recovery on an after tax basis. Investor 110 can use the tax advantages generated from donations of patents to offset income from successful investments. These tax savings value can be shared with the investor's limited partners by way of reduced management fees.

Advantageously, system 100 provides for venture capital or private equity investor 110 to take a security interest in an IA in venture 120 in order to secure the debt piece of an investment. In the event of a default, investor 110, as a secured party, is governed by Article 9 of the Uniform Commercial Code (U.C.C.). Article 9 provides:
(1) a secured party can retain the collateral in full satisfaction of the obligation, provided that proper notice is sent to the debtor and other secured parties (if any) and no objections are made or (2) a secured party may dispose of the collateral in a commercially reasonable manner (and subsequently pursue any deficiency) or, remit the excess to the debtor.

Currently, a new Article 9 to the U.C.C. has been adopted by a majority of the states in the United States of America. New Article 9 modifies provision (1) (above) to provide for the retention of collateral in partial satisfaction of the obligation. Partial satisfaction of the obligation allows the debtor to pursue any deficiency remaining after the debtor is credited with a value (of the collateral) as may be agreed to by the parties.

A charitable donation of collateral would not constitute disposition in a "commercially reasonable manner" under provision (2) described above. Thus, to retain the intellectual asset collateral, under provision (1), investor 110 must obtain the consent of the debtor as well as other secured parties before making a donation of the collateral to a qualified charity.

Factors which may affect whether the debtor or other secured parties consent can include an economic analysis. If the debt owed to investor 110 exceeds what the debtor and any other secured creditors perceive as the value of the patent, it is likely that an agreement can be reached whereby investor 110 retains the patent in full satisfaction of the debt. In an alternative environment, the debtor may consider any personal guarantees or other collateral held by the secured party. For example, if there is a personal guaranty or other collateral involving significant personal items of the debtor or other valuable business interests, the debtor may wish to simply give up the patents in full satisfaction of the debt rather than risk personal loss or the loss of other valuable collateral. In an alternative embodiment, the debtor may simply want to be finished with an unfortunate experience and allow the secured party to retain the collateral in full satisfaction of the debt.

In an exemplary embodiment, if a secured party disposes of the collateral via an auction, the secured party may itself bid on the collateral either with cash or via a credit bid, acquire it, and then make a contribution to satisfaction of the debt. However, such a bid to purchase patents may be a factor to establish a fair market value for purposes of determining the charitable deduction.

As discussed above, investor 110 has the ability to make a tax deductible contribution of the collateral (e.g., IA) as allowed under Section 170 of the Internal Revenue Code for charitable contributions. To give rise to a tax deduction, the contribution must be a transfer of money or property to a permissible donee without receipt of economic consideration or benefit in return. Whether investor 110 can utilize, in whole or in part, the deduction allowable under Section 170 to reduce income taxes depends on the situation of investor 110.

First, to qualify for a deduction, investor 110 must transfer its entire interest in the property to a permissible donee. In an exemplary embodiment, where the collateral is a patent, the transfer must consist of the patent and all rights pertaining thereto. The interest of investor 110 in the transferred property must be unencumbered. The contribution must be completed and documented in the manner in which the transfer of legal ownership of a patent is normally consummated. For example, the transfer can include execution of an assignment and the registration of the transfer with the United States Patent and Trademark Office.

In an exemplary embodiment, contribution of intellectual assets can be made to one of the following types of permissible donees: (1) a state, a possession of the United States, any political subdivision of a state or possession, the United States, or the District of Columbia, so long as the contribution is made exclusively for public purposes; or (2) an organization described in Section 501(c)(3) of the Internal Revenue Code, which is an organization not classified as a private foundation under Section 509(a) of the Internal Revenue Code. In the example of an entity described in Section 501(c)(3), a deduction is permitted only if the entity is created or organized under the law of any state, the District of Columbia, the United States, or any possession thereof. A contribution by a corporation to a trust, check, fund, or foundation is deductible only if it is to be used within the United States or its possessions exclusively for purposes specified in Section 501(c)(3)(3). However, the requirement that a gift by a corporation must be used within the United States or its possessions does not apply if the gift is made to an entity that is organized as a corporation under the law of any state, the District of Columbia, the United States, or a possession thereof.

The amount of a deduction for a charitable contribution of a patent is equal to the patent's fair market value on the date of the contribution, provided that certain requirements discussed hereinafter are met. Revenue Ruling 58-260, 1958-1 C.B. 126. "Fair market value" is the price at which the patent would change hands between a willing buyer and a willing seller, neither being under any compulsion to buy or sell and both having reasonable knowledge of relevant facts concerning the property. Treasury Regulations §1.170A-1(c)(2). To generate a full fair market value deduction, the donated property must be a capital asset in the hands of the donor and must have been held by the donor for at least one year prior to the transfer to the charitable donee. In the case of property received by a donor on the foreclosure of a security interest, the holding period begins on the date the donor becomes the legal owner of the property, not on the date the security interest was granted.

The amount that may be deducted by a taxpayer in any year is limited under Section 170(b) of the Internal Revenue Code. In the case of an individual, a charitable contribution of property is generally allowable as a deduction to the extent that the aggregate of all such contributions for the year does not exceed 30 percent of the taxpayer's contribution base for the year; a carryover of the excess to each of the five succeeding taxable years is allowed. The term "contribution base" means the taxpayer's adjusted gross income computed without regard to any net operating loss carryback. Internal Revenue Code §170(b)(1)(F). In the case of a corporation, the total deduction allowed for all charitable contributions for any taxable year may not exceed 10 percent of the taxpayer's taxable income, computed with certain adjustments listed in Section 170(b)(2). A five-year carryover of the excess is allowed.

A further requirement for the deduction of a charitable contribution of property is proper substantiation and reporting of the gift. The following rules apply to the gift of a patent:

A charitable contribution of a patent worth $250 or more must be substantiated by the receipt from the charitable donee of a written acknowledgment, obtained on or before the earlier of the date on which the taxpayer files a return for the year in which the contribution was made or the due date for the filing of the return. The receipt must meet all requirements specified by the Internal Revenue Service.

When an individual, closely held corporation, personal service corporation, partnership, or S corporation claims a charitable contribution deduction for a gift of property worth more than $500, Form 8283 must be filed with the appropriate taxpayer's income tax return for the year of the gift.

If a taxpayer is required to file Form 8283 for a gift of property, and the deduction claimed for that gift and all similar items of property exceeds $5,000, an appraisal requirement also applies. The donor must obtain a qualified appraisal of the property and attach an appraisal summary to the income tax return on which the charitable contribution deduction is claimed. A qualified appraisal may be made at any time from 60 days before the donation up to the due date for the return on which the donor reports the gift. The appraisal and appraisal summary must comply with regulations issued by the Internal Revenue Service, and the appraisal must be conducted by a "qualified appraiser," as defined in the regulations. Treasury Regulations §1.170A-13.

The appraisal of the IA may be based on several methods. The most common means for appraisal of the IA are the cost, market and income approaches. The cost approach is based on the economic cost to replace or recreate the asset. This method is based on the theory that the recipient of the IA or licensee avoids these costs by obtaining the IA from others. The cost approach considers the following items, among others: research and development, testing and regulatory approval costs, patent protection costs, equipment and other capital investments, and the opportunity costs of diverted resources.

The market approach is based upon the arm's-length price paid in comparable transactions. This approach is based on the theory that the user of the IA is not willing to pay more than others have paid for similar rights. Relevant criteria to assess what constitutes a comparable transaction include: nature of technology, extent of patent protection, market size and characteristics, and the terms of the transfer agreement including exclusivity and field of use restrictions.

The income approach is based upon the present value of the expected future income stream that may be generated by the IA. This approach is based on the theory that the user of an IA is willing to pay some portion of its economic gain from use. The computation of value is well known and based on the amount of the income stream, its duration and the risk associated with the income.

For portfolio companies seeking a subsequent round of investment, it is contemplated that the Investor's residual rights may terminate upon this later funding as such a release may be necessary to encourage the secondary investment. Such secondary funding is often strong evidence of the likely success of the venture thereby reducing the potential for application of the inventive strategy.

Figure 2:
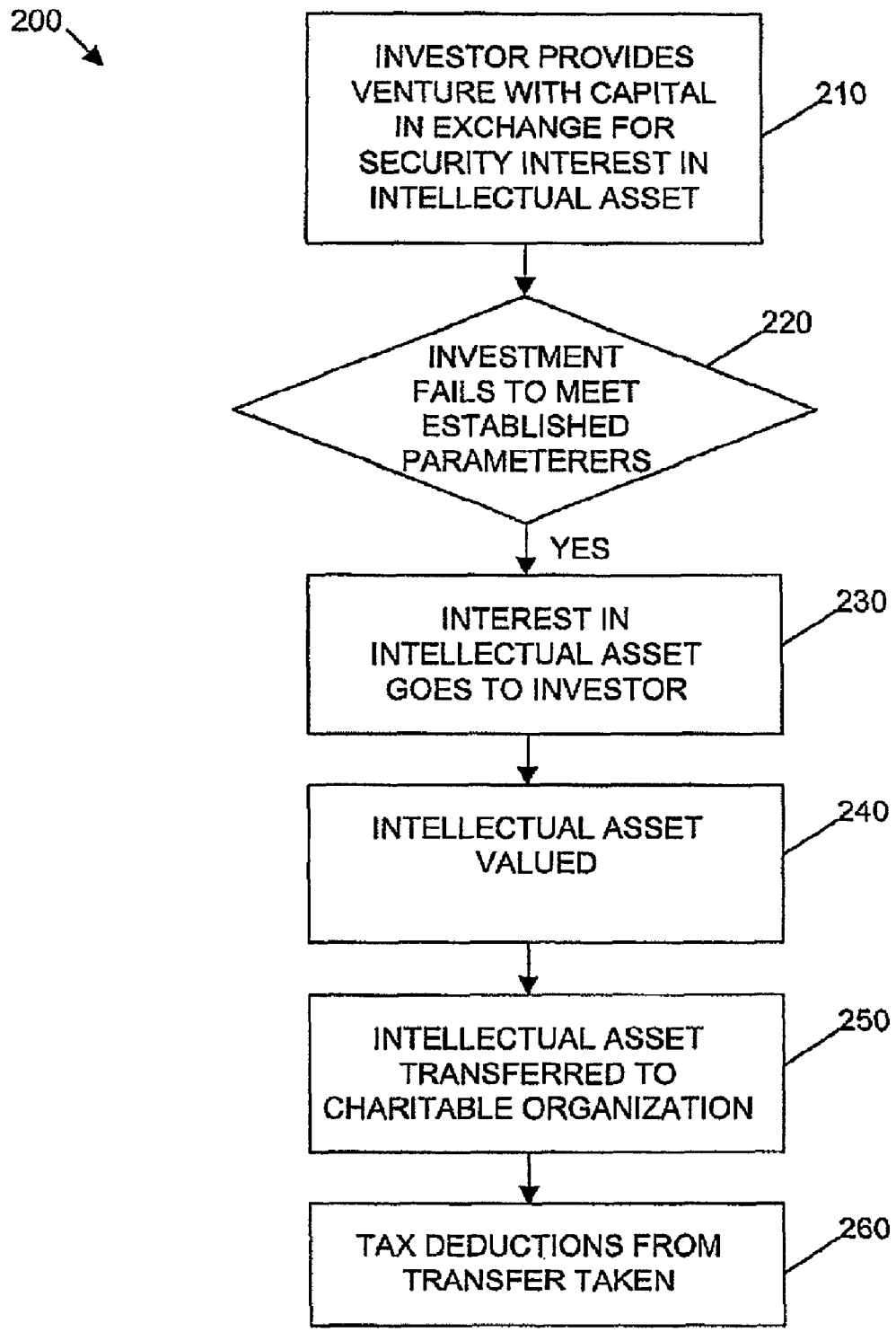
FIG. 2 is a flow diagram illustrating an investment risk minimization method in accordance with another exemplary embodiment.

FIG. 2 illustrates a flow diagram 200 of exemplary steps in a process of investment risk minimization. In an exemplary embodiment, a step 210 is performed in which an investor provides a venture with an investment in exchange for a security interest in an intellectual asset. An investor can provide an investment as a first round funding investment or a seed investment. A security interest can involve a reversionary ownership right which reverts upon failure of the investment or failure by the venture to meet parameters determined in the investment agreement.

After step 210, a step 220 is performed in which a determination is made as to whether the investment has met established parameters, such as, when the venture has not met established milestones or parameters. Alternatively, failing to meet established parameters can include the ending of the venture. Such milestone or parameters may include sales or profit goals, customer penetration, strategic partnership agreements, establishing of a distribution network, or other factors fundamental to the success of the venture.

If the investment fails to meet established parameters, a step 230 is performed in which ownership interest in the intellectual asset goes to the investor. For example, if the ownership asset is a patent, the investor is assigned ownership rights to the patent. After step 230, a step 240 is performed in which the intellectual asset is valued. For example, the fair market value (FMV) of the intellectual asset may be used. In an exemplary embodiment, the FMV of the intellectual asset is determined by using the cost, market or income approach described herein. Alternatively, a value greater or less than the FMV can be used, wherein the asset is valued by other ordinary and accustomed valuation schemes.

After step 240, a step 250 is performed in which the intellectual asset is donated to a charitable organization. In an exemplary embodiment, the investor holds the intellectual asset for one year. After step 250, a step 260 is performed in which tax deductions are taken for the donation of the intellectual asset to the charitable organization.

Figure 3:
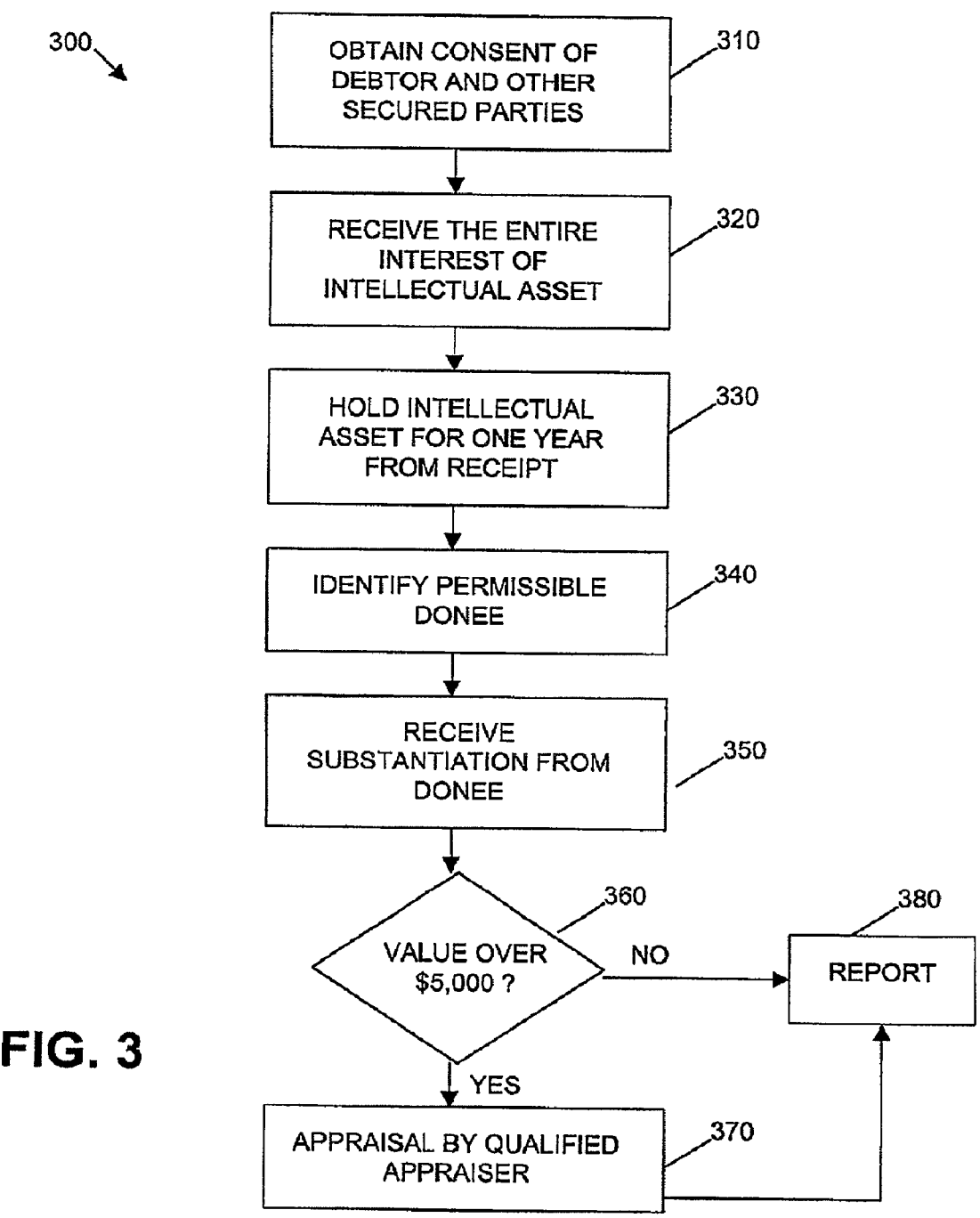
FIG. 3 is a flow diagram illustrating an investment risk minimization method in accordance with yet another exemplary embodiment.

FIG. 3 illustrates a flow diagram 300 of exemplary steps in a process of investment risk and its minimization. In an exemplary embodiment, step 310 is the form in which investor 110 obtains the consent of the debtor and other secured parties (if any). As explained above with reference to FIG. 1, Article IX of the U.C.C. requires cooperation of the debtor and other secured parties. After step 310 is performed, a step 320 is performed in which investor 110 receives the entire interest of the intellectual asset subject to a security interest under the investment agreement between the investor and the debtor.

After step 320, a step 330 is performed in which the received intellectual asset is held for one year from the date investor 110 becomes owner of the property. This one year waiting period is intended to achieve long term capital gain status. In step 340, investor 110 identifies a permissible donee. As described above, a permissible donee is prescribed by law.

In step 350, investor 110 receives substantiation from the donee. In a step 360, if the intellectual asset is valued over $5,000, a step 370 is performed in which an appraisal by a qualified appraiser is obtained. After step 360 is performed or if the value of the collateral is not over $5,000, a step 370 is performed in which a report of the donation is provided to the IRS.

Investment risk minimization system 100 described with reference to FIGS. 1-3 advantageously provides investors with a means of recouping to some degree losses in investments. System 100 is particularly useful where investments are made in technology-oriented companies having few tangible assets.

While the embodiments illustrated in the FIGURES and described above are presently preferred, it should be understood that these embodiments are offered by way of example only. Other embodiments may include additional procedures or steps not described here. The invention is not limited to a particular embodiment, but extends to various modifications, combinations, and permutations that nevertheless fall within the scope and spirit of the appended claims.

What is claimed is:

1. In an investment risk minimization system involving a venture capital investor and a venture needing investment from the venture capital investor, a computer-implemented method comprising:

identifying by a computing device a venture having an intellectual asset;

determining by a computing device a value of the intellectual asset held by the venture;

establishing an amount of the investment at least partially based on the value of the intellectual asset;

determining by a computing device one or more venture minimum performance conditions needed for the investment to be recouped over a predetermined period of time, wherein the minimum performance conditions comprise at least one of a return on investment goal, an earnings goal, a market penetration goal, a gross sales goal or a combination thereof;

transferring ownership of the intellectual asset to an intellectual asset holding company;

providing the investment to the venture or the intellectual asset holding company;

receiving a security interest in the intellectual asset or equity of the intellectual asset holding company, the security interest securing an ownership right to the intellectual asset or the equity of the intellectual asset holding company upon failure by the venture to meet minimum performance conditions;

obtaining ownership in the intellectual asset or the equity of the intellectual asset holding company if the venture receiving the investment fails to meet the minimum performance conditions;

determining whether the intellectual asset or the equity of the intellectual asset holding company has residual value based on predetermined considerations, wherein the intellectual asset or the equity of the intellectual asset holding company will be determined to have residual value if it is determined that (i) there is a likely future market for the intellectual asset, (ii) there is a likelihood that other ventures can use the intellectual asset, or (iii) there is a likelihood that other ventures can obtain competitive protection by restricting access to the intellectual asset;

determining by a computing device that the intellectual asset or the equity of the intellectual asset holding company has residual value and should be transferred to a third party;

determining by a computing device an appraised fair value for the intellectual asset or the equity of the intellectual asset holding company based on predetermined factors, wherein the factors comprise at least one of cost of selling the intellectual asset or the equity of the intellectual asset holding company within a reasonable period of time, sales of comparable intellectual assets, cost of reproduction of the intellectual asset, opinion appraisals of the intellectual asset, and any combination thereof;

calculating by a computing device a tax impact obtained from transferring of the intellectual asset or the equity of the intellectual asset holding company to the third party; and transferring the intellectual asset or the equity of the intellectual asset holding company to the third party based on the appraised fair value of the intellectual asset.

2. In an investment risk minimization system involving a venture capital investor and a venture needing investment from the venture capital investor, a computer-implemented method comprising:

identifying by a computing device a venture having an intellectual asset;

determining by a computing device a value of the intellectual asset held by the venture;

establishing an amount of the investment at least partially based on the value of the intellectual asset;

determining by a computing device one or more venture minimum performance conditions needed for the investment to be recouped over a predetermined period of time, wherein the minimum performance conditions comprise at least one of a return on investment goal, an earnings goal, a market penetration goal, a gross sales goal or a combination thereof;

transferring ownership of the intellectual asset to an intellectual asset holding company;

providing the investment to the venture or the intellectual asset holding company;

receiving a security interest in the intellectual asset or equity of the intellectual asset holding company, the security interest securing an ownership right to the intellectual asset or the equity of the intellectual asset holding company upon failure by the venture to meet minimum performance conditions;

obtaining ownership in the intellectual asset or the equity of the intellectual asset holding company if the venture receiving the investment fails to meet the minimum performance conditions;

determining whether the intellectual asset or the equity of the intellectual asset holding company has residual value based on predetermined considerations, wherein the considerations for determining whether an intellectual asset or the equity of the intellectual asset holding company has residual value comprise at least one of: (i) whether there is a likely future market for the intellectual asset or the equity of the intellectual asset holding company, (ii) whether there is a likelihood that other ventures can use the intellectual asset or the equity of the intellectual asset holding company, and (iii) whether there is a likelihood that other ventures can obtain competitive protection by restricting access to the intellectual asset or the equity of the intellectual asset holding company;

determining by a computing device that the intellectual asset or the equity of the intellectual asset holding company has residual value and should be transferred to a third party;

calculating by a computing device a tax impact obtained from transferring of the intellectual asset or the equity of the intellectual asset holding company to the third party; and transferring the intellectual asset or the equity of the intellectual asset holding company to the third party based on the residual value of the intellectual asset.

3. In an investment risk minimization system involving an investor and a venture needing investment from the investor, a computer-implemented method, performed in essentially the following order, comprising:

identifying by a computing device a venture having an intellectual asset;

determining by a computing device a value of the intellectual asset held by the venture;

establishing an amount of the investment at least partially based on the value of the intellectual asset;

calculating by a computing device a tax impact obtained from transferring of the intellectual asset to an intellectual asset holding company;

transferring ownership of the intellectual asset to the intellectual asset holding company;

providing the investment to the venture or the intellectual asset holding company;

receiving a security interest in the intellectual asset or equity of the intellectual asset holding company, the security interest securing an ownership right to the intellectual asset or the equity of the intellectual asset holding company upon failure by the venture to meet minimum performance conditions;

obtaining ownership in the intellectual asset or the equity of the intellectual asset holding company if the venture receiving the investment fails to meet the minimum performance conditions;

determining whether the intellectual asset or the equity of the intellectual asset holding company has residual value based on predetermined considerations, wherein the intellectual asset will be determined to have residual value if it is determined that (i) there is a likely future market for the intellectual asset, (ii) there is a likelihood that other ventures can use the intellectual asset, or (iii) there is a likelihood that other ventures can obtain competitive protection by restricting access to the intellectual asset;

determining by a computing device that the intellectual asset has residual value and should be transferred to a third party;

determining by a computing device an appraised fair value for the intellectual asset based on predetermined factors, wherein the factors comprise at least one of cost of selling the intellectual asset within a reasonable period of time, sales of comparable intellectual assets, cost of reproduction of the intellectual asset, opinion appraisals of the intellectual asset, and any combination thereof; and transferring the intellectual asset or rights thereto to the third party based on the appraised fair value of the intellectual asset.

4. In an investment risk minimization system involving an investor and a venture needing investment from the venture capital investor, a computer-implemented method, performed in essentially the following order, comprising:

identifying by a computing device a venture having an intellectual asset;

determining by a computing device a value of the intellectual asset held by the venture;

establishing an amount of the investment at least partially based on the value of the intellectual asset;

calculating by a computing device a tax impact obtained from transferring of the intellectual asset to an intellectual asset holding company;

transferring ownership of the intellectual asset to the intellectual asset holding company;

providing the investment to the venture or the intellectual asset holding company;

receiving a security interest in the intellectual asset or the equity of the intellectual asset holding company, the security interest securing an ownership right to the intellectual asset or the equity of the intellectual asset holding company upon failure by the venture to meet minimum performance conditions;

obtaining ownership in the intellectual asset or the equity of the intellectual asset holding company if the venture receiving the investment fails to meet the minimum performance conditions;

determining whether the intellectual asset or the equity of the intellectual asset holding company has residual value based on predetermined considerations, wherein the considerations for determining whether an intellectual asset has residual value comprise at least one of: (i) whether there is a likely future market for the intellectual asset, (ii) whether there is a likelihood that other ventures can use the intellectual asset, and (iii) whether there is a likelihood that other ventures can obtain competitive protection by restricting access to the intellectual asset;

determining by a computing device that the intellectual asset or the equity of the intellectual asset holding company has residual value and should be transferred to a third party; and transferring the intellectual asset or rights thereto to the third party based on the residual value of the intellectual asset.

5. In an investment risk minimization system involving an investor and a venture needing investment from the venture capital investor, a computer-implemented method comprising:

identifying by a computing device a venture having an intellectual asset;

determining by a computing device a value of the intellectual asset held by the venture;

establishing an amount of the investment at least partially based on the value of the intellectual asset;

determining by a computing device one or more venture minimum performance conditions needed for the investment to be recouped over a predetermined period of time, wherein the minimum performance conditions comprise at least one of a return on investment goal, an earnings goal, a market penetration goal, a gross sales goal or a combination thereof;

providing the investment to the venture having the intellectual asset;

receiving a security interest in the intellectual asset, the security interest securing an ownership right to the intellectual asset upon failure by the venture to meet minimum performance conditions;

obtaining ownership in the intellectual asset if the venture receiving the investment fails to meet the minimum performance conditions;

determining whether the intellectual asset has residual value based on predetermined considerations, wherein the considerations for determining whether an intellectual asset has residual value comprise at least one of: (i) whether there is a likely future market for the intellectual asset, (ii) whether there is a likelihood that other ventures can use the intellectual asset, and (iii) whether there is a likelihood that other ventures can obtain competitive protection by restricting access to the intellectual asset;

determining by a computing device that the intellectual asset has residual value and should be auctioned to a third party; and placing the intellectual asset up for auction.

* * * * *

UNITED STATES PATENT AND TRADEMARK OFFICE
CERTIFICATE OF CORRECTION

| | |
|---|---|
| PATENT NO. | : 7,930,231 B2 |
| APPLICATION NO. | : 12/027812 |
| DATED | : April 19, 2011 |
| INVENTOR(S) | : James E. Malackowski et al. |

It is certified that error appears in the above-identified patent and that said Letters Patent is hereby corrected as shown below:

At Page 1 (Item 56) Col. 2, Line 5, Under Other Publications, change "IThomson-CSF Gains" to --Thomson-CSF Gained--.

At Sheet 2 of 3 (Box No. 220) (Fig. 2), Line 4, Change "PARAMETERERS" to --PARAMETERS--.

At Column 4, Line 10 (Approx.), Change "donated," to --donated.--.

At Column 4, Line 55, Change "LA" to --IA--.

Signed and Sealed this
Tenth Day of January, 2012

David J. Kappos
*Director of the United States Patent and Trademark Office*